June 5, 1962 — I. E. WIEGERS — 3,037,525
FOUR-WAY CHANGEOVER VALVE
Filed Aug. 14, 1957
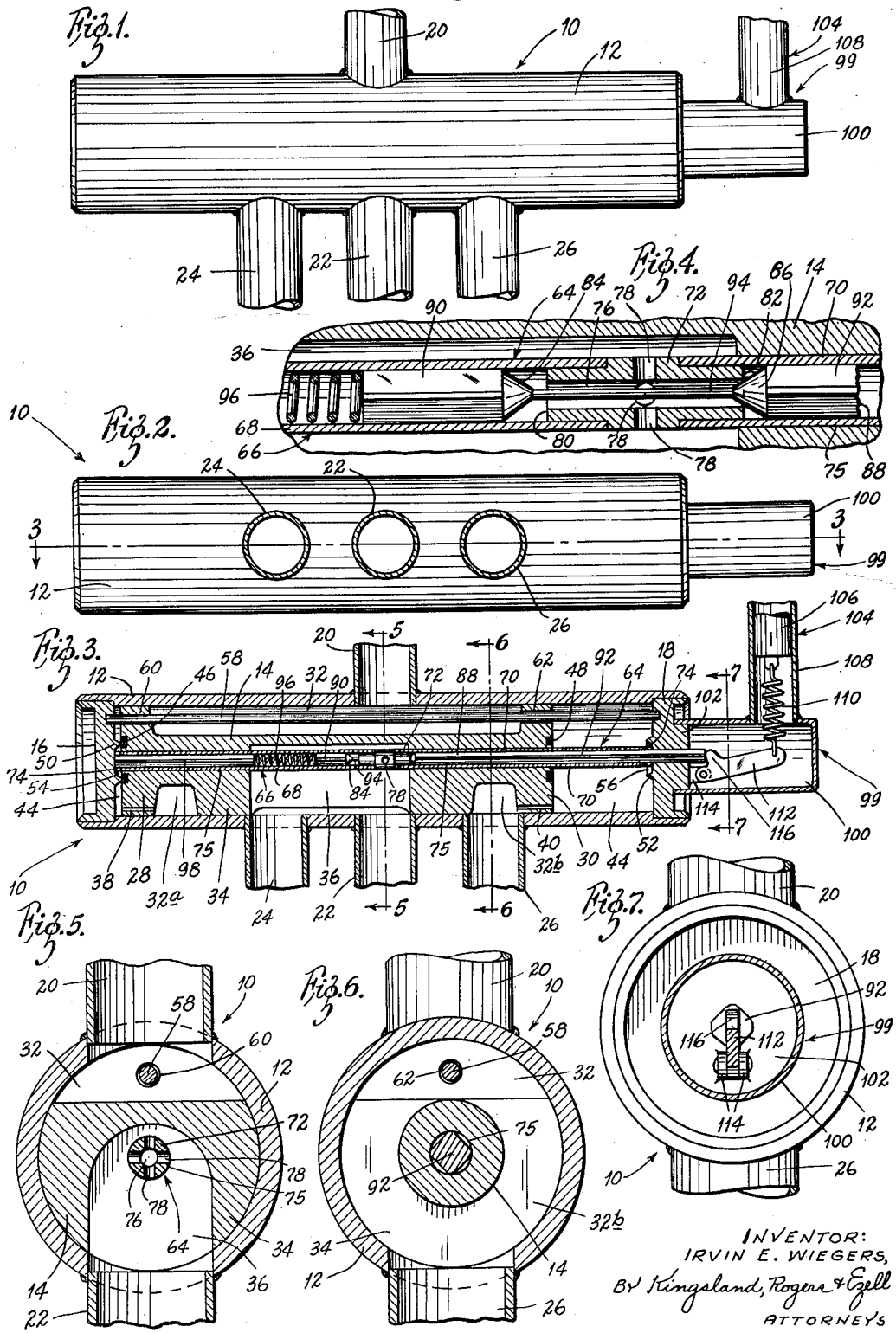
INVENTOR:
IRVIN E. WIEGERS,
BY Kingsland, Rogers & Ezell
ATTORNEYS

United States Patent Office 3,037,525
Patented June 5, 1962

3,037,525
FOUR-WAY CHANGEOVER VALVE
Irvin E. Wiegers, St. Louis, Mo., assignor to Alco Valve Company, St. Louis, Mo., a corporation of Missouri
Filed Aug. 14, 1957, Ser. No. 678,093
7 Claims. (Cl. 137—625.29)

The present invention relates generally to valves, and more particularly to a four-way changeover valve of the type employed in reverse cycle refrigerating devices.

In brief, the present invention contemplates a cylindrical housing and a valve piston movable therein to connect a high pressure inlet to one work line while connecting a low pressure outlet to another work line. Reverse movement of the valve piston effects a reversal of connections between the two work lines and the high and low pressure ports.

The valve element takes the general form of the familiar D-valve which lends itself well to the making of four-way connections and, at the same time, enables adequate capacity with relatively small size and consequent improvement in leakage factor.

A feature of the present valve is its control mechanism, which takes the form of a pilot valve disposed centrally of the main cylindrical housing and arranged selectively to distribute the high and low pressures available at the inlet and outlet ports, respectively, to effect a desired movement of the main valve piston. Actuation of the pilot valve is effected mechanically by power means outside the main cylindrical housing.

It is an object of the present invention to provide a novel four-way changeover valve which incorporates a pilot valve adapted for selective operation to effect changes in the main valve connections.

It is another object of the invention to provide a novel four-way changeover valve which incorporates a pilot valve which is completely enclosed in the main valve housing.

It is another object of the invention to provide a novel four-way changeover valve which may be selectively actuated by a simple unidirectional power element.

The foregoing objects, along with additional objects and advantages, will be apparent from the following description of a specific embodiment of the invention as depicted in the accompanying drawing, in which:

FIGURE 1 is a plan view of a valve assembly constructed in accordance with the present invention;

FIGURE 2 is an elevational view of the valve assembly of FIGURE 1;

FIGURE 3 is a longitudinal section taken generally along the line 3—3 of FIGURE 2;

FIGURE 4 is an enlarged fragmentary section similar to the central portion of FIGURE 3 showing additional sectional detail;

FIGURE 5 is a transverse vertical section taken generally along the line 5—5 of FIGURE 3;

FIGURE 6 is a transverse vertical section taken generally along the line 6—6 of FIGURE 3; and FIGURE 7 is a transverse vertical section taken generally along the line 7—7 of FIGURE 3.

Directing more particular attention to the details of the drawing, the numeral 10 designates generally a four-way changeover valve constructed in accordance with the teachings of the present invention.

The valve 10 comprises a cylinder 12 and a piston 14 movably disposed therein. The cylinder 12 is illustrated as being formed from tubular stock, the ends of which are slightly bored out to receive cylinder heads 16 and 18, the latter being fitted and sealed into the end of the cylinder, as by soldering.

The cylinder 12 has a high pressure inlet pipe 20 entering midway between its ends. Diametrically opposite, the cylinder 12 has a low pressure outlet pipe 22. Alongside the low pressure connection 22, and preferably in alignment with it, there are two working lines, namely, a first working line 24 and a second working line 26. The pipes 20, 22, 24 and 26 are illustrated as being inserted into appropriately drilled holes in the wall of the cylinder 12 and soldered therein. The length of the several pipes may, of course, be extended as required by the circumstances of construction and installation.

The piston 14 is preferably formed out of a single piece of material, as by casting, and has its outermost cylindrical surface turned to uniform diameter in a single machining operation. It has opposite piston heads 28 and 30 between which it is cut away on its upper surface to provide a fluid passage space 32, as clearly illustrated in FIGURES 3, 5, and 6. As also indicated in these figures, the space 32 includes end portions 32a and 32b which extend completely around the lower portion of the piston 14. The lower portion of the piston 14 intermediate the spaces 32a and 32b comprises a land portion 34 (FIGURES 3 and 5) having a recess 36 to provide a D-valve space. From the foregoing, it is apparent that the space 32, including the portions 32a and 32b, is at all times in communication with the high pressure inlet 20, while the space 36 is always in communication with the low pressure port 22 in addition to being selectively communicated with one of the other of the working ports 24 and 26.

The piston heads 28 and 30 are provided with bleeder passages 38 and 40, respectively, which serve to communicate the high pressure spaces 32a and 32b with the cylinder space beyond the respective ends of the piston 14. Thus, the bleeder passage 38 communicates high pressure to an end space 42, while the bleeder passage 40 communicates high pressure to an end space 44. The outer faces of the piston heads 28 and 30 are provided with valve sealing rings 46 and 48 which are inserted in appropriate circular grooves therein. These rings are designed to seal respectively with circular valve elements 50 and 52 on the respective cylinder heads 16 and 18 as the piston 14 moves back and forth between its extreme positions. FIGURE 3 illustrates the manner in which the valve elements 46 and 50 are adapted to cut off communication between the high pressure space 42 and a space 54 within the ring 50. Movement of the piston 14 to its opposite extreme position will, of course, disestablish communication between the high pressure space 44 and a space 56 within the ring 52.

The two cylinder heads 16 and 18 have a guide rod 58 extending between them and extending slidably through bored holes 60 and 62 in the upper portions of the cylinder heads 28 and 30. This rod, of course, serves to keep the recess 36 in alignment with the ports 22, 24 and 26.

A pilot valve assembly, designated generally by the numeral 64, includes a conduit assembly 66 comprising similar tubes 68 and 70 interconnected by an adapter 72. This conduit assembly 66 extends the length of the interior of the cylinder 12 and has its opposite ends disposed within the spaces 54 and 56, defined by the valve rings 50 and 52. The ends of the assembly 66 are provided with notches or holes 74 so as to provide continuous communication between the space 54 and the adjacent tube 68 and between the space 56 and the adjacent tube 70. The piston 14 is provided with a central bore 75 which makes a smooth sliding fit with the assembly 66.

As clearly illustrated in FIGURE 4, the adapter 72 has a central passage 76 which communicates with transverse cross passages 78 at the center of the member. The longitudinal passage 76 terminates at one end in a valve seat 80 and at the other end in a valve seat 82, which seats cooperate with respective conical portions 84 and 86 of a valve rod 88 so as selectively to communicate either the tube 68 or the tube 70 with the D-valve space 36 of the piston 14. The valve rod 88 includes, in addition to the conical faces 84 and 86, main body portions 90 and 92, having square cross-sections so as not unduly to obstruct the passage through the tubes 68 and 70, and a small diameter intermediate portion 94 which interconnects the conical portions 84 and 86. The free end of the square portion 90 of the rod 88 abuts one end of a compression spring 96 disposed within the tube 68, and a backup bar 98, also of square cross-section, extends from the opposite end of the spring 96 to abut with the face of the cylinder head 16. This arrangement provides a constant biasing force, derived from the spring 96, which tends to close the conical valve portion 84 against the seat 80.

The square portion 92 of the rod 88 extends beyond the end of the tube 70 and passes in a smooth sliding fit through an appropriate square hole in the cylinder head 18.

As illustrated in FIGURES 3 and 7, an actuating mechanism 98 is incorporated with the cylinder head 18. The assembly 98 includes a tubular housing 100, appropriately secured to a boss portion 102 of the cylinder head 18, to which housing is secured, as by soldering, a solenoid assembly illustrated fragmentarily in FIGURE 3 and designated by the numeral 104. The solenoid 104 includes an armature 106 movable in a tubular core 108 upon which the solenoid coil (not shown) will be understood to be mounted. The solenoid armature 106 is connected by means of a tension spring 110 to an actuating lever 112 pivotally secured to ear elements 114 integral with a boss portion 102 of the cylinder head 18. The lever 112 has a transversely extending portion 116 in position for engaging the projecting end of the square rod 92. Clearly, the actuating mechanism 99 is adapted to overcome the biasing force of the compression spring 96 when it is desired to unseat the valve 84 and to seat the valve 86.

In use, the four-way valve 10 may be connected in various ways. Typically, it may be employed in a refrigeration system having a compressor, a condenser-evaporator, and an evaporator-condenser. Such a combination may be employed in a reverse cycle operation wherein the heat transfer devices alternate as evaporator and condenser, such application being well known in the art. Thus, in such an instance, the pipe 20 of the valve 10 will be connected to the outlet side of the compressor and the pipe 22 will be connected back into the suction side of the compressor. The working ports 24 and 26 will be connected to respective heat transfer units adapted to function either as an evaporator or as a condenser.

Connected as above described, the valve 10 will admit high pressure at all times to the space 32, including the spaces 32a and 32b, between the piston heads 28 and 30. The suction line 22 will remain at all times in communication with the D-valve chamber 36 which will then be subjected to constant pressure reduction. In normal operation, the piston 14 will be disposed at one or the other of its extreme positions of travel within the cylinder 12. Thus, as illustrated in FIGURE 3, the working line 26 is communicated with the high pressure space 32b while the working line 24 is communicated with the low pressure space 36. Upon movement of the piston 14 to the opposite end of the cylinder 12, the working line 26 will be communicated with the low pressure space 36, and the working line 24 will be communicated with the high pressure space 32. It is, of course, the primary purpose of the valve 10 to effect this reversal of connections for refrigerant flow in a refrigerating system.

Movement of the piston 14 between its two operative positions is effected under the influence of the actuating mechanism 98 working through the pilot valve assembly 64. The force for moving the piston 14 is derived from differential pressures existing within the cylinder 12. It is, of course, clear from the obvious symmetry of the piston 14 about a transverse center line and from the aforementioned distribution of high and low pressures within the piston heads 28 and 30, that the piston will tend to be in balanced condition. A further distribution of high pressure through the bleed passages 38 and 40 to the end spaces 42 and 44 will not, of itself, affect this balanced condition. However, it will be observed that the arrangement of parts in the pilot valve assembly 64 is such that the one or the other of the conical valves 84 and 86 will always be in open position whereby communication will be established between the low pressure space 36 and one of the end spaces 42 and 44. Thus, in the illustration of FIGURE 3, the conical valve 84 being open, the end space 42 is communicated through the tube 64 and the adapter 72 to the low pressure space 36, the result being the extension of a low pressure condition to the end space 42. Inasmuch as the low pressure passages here opened up are larger than the bleed passage 38, and hence have greater capacity, a reduced pressure will be effective against the face of the piston head 28 which will be unable to balance the pressure against the opposite face of the piston head 30, so that the piston 14 will be moved to its illustrated position. As the valve ring 46 moves into abutment with the circular valve element 50, the flow of fluid from the space 42 to the suction pipe 22 is checked and only the space 54 within the ring 50 remains under reduced pressure, which is sufficient to retain the piston 14 in its moved position.

As is clear from the drawing, the open position of the conical valve 84 is effected and maintained by retraction of the solenoid armature 106 which is effective to pivot the lever 112 so as to force the valve rod 88 against the biasing action of the spring 96 until the valve 86 is closed upon its seat 82. The spring 110 enables the solenoid core 106 to move to its fully actuated position even though the valve 86 may seat prior to such full movement. This reduces heating and other inefficiencies of the solenoid. Release of the armature 106, however, will enable the spring 96 to force the valve rod 88 to a position wherein the valve 84 will become seated and the valve 86 will open. The effect of this will be to communicate the end space 44 with the low pressure space 36 so that the high pressure existing in the space 42 will now move the piston 14 to its opposite position. This, as previously indicated, will cause a reversal of connections wherein the high pressure pipe 20 will be communicated with the working pipe 24 and the low pressure pipe 22 will be communicated with the working pipe 26.

Attention is directed to the general physical shape and arrangement of the valve 10 wherein the relatively long, narrow shape and the alignment of ports provide obvious advantages in installation. Further, the inherent advantage of D-valve construction wherein the high pressure within the valve assists in maintaining an adequate seal between high pressure and low pressure ports is regarded as a feature of this valve.

Clearly, there has been provided a four-way changeover valve which fulfills the objects and advantages sought therefor.

It is to be understood that the foregoing description and accompanying drawing have been given only by way of illustration and example. It is further to be understood that changes in the form of elements, rearrangement of parts, and the substitution of equivalent elements, all of which will be obvious to those skilled in the art, are contemplated as being within the scope of the present invention, which is limited only by the claims which follow.

What is claimed is:

1. A four-way changeover valve comprising in combination, a cylinder having end closures, a first port in the side of the cylinder, a second port in the side of the cylinder spaced peripherally from the first port, a third and a fourth port in the side of the cylinder in line with and spaced axially from the second port, a piston disposed in the cylinder for non-rotative sliding movement axially thereof, said piston having a head at each of its ends for cooperation with the cylinder end closures to define a variable volume end chamber beyond each piston head, the piston also having recessed spaces intermediate said heads, said recessed spaces including a first space positioned in said piston for communicating the first port with the third port when the piston is at one position in the cylinder and with the fourth port when the piston is at another position in the cylinder, said recessed spaces further including a second space positioned in said piston for communicating the second port with the fourth port when the piston is at said one position in the cylinder and with the third port when the piston is at said other position in the cylinder, restricted passage means so positioned in the piston for constantly communicating said first space with each of said end chambers, and valved passage means in the piston for selectively communicating said second space with one or the other of the end chambers, said valved passage means including a pilot valve assembly having an axially movable valve member connected to mechanical actuating means.

2. The combination of claim 1 wherein the valved passage means includes a bore extending axially from end to end of the piston and having communication with the second recessed space, and wherein the pilot valve assmbly includes a valve rod extending to the outside of the cylinder for mechanical actuation of the pilot valve.

3. The combination of claim 2 wherein the pilot valve assembly includes a conduit assembly extending slidably through the piston bore, said conduit assembly having a length substantially equal to the axial spacing of the cylinder end closures and being substantially immovably confined therebetween.

4. The combination of claim 3 wherein the conduit assembly has a central transverse opening in communication with the second recessed space and an axially oriented valve seat on opposite sides of said opening, and oppositely directed valve portions on the valve rod adapted to occupy said seats.

5. The combination of claim 4 wherein the valve portions are interconnected by a spacing element which prevents their being simultaneously seated, the actuating means comprising a spring biasing the valve portions in one direction and a selectively operable actuator for moving the valve portions in an opposite direction.

6. A four-way changeover valve comprising in combination, a cylinder having closed ends, a piston slidably disposed in said cylinder, said piston having a piston head at each end thereof cooperative with the end portions of the cylinder to define pressure chambers beyond the respective ends of the cylinder, a plurality of ports including a single high pressure port, a single low pressure port, and at least two working ports in said cylinder, a plurality of recessed spaces in said piston for selectively interconnecting said high and low pressure ports with respectively different working ports and for interchanging the connections, restricted passage means in the piston for constantly communicating said high pressure port with each of the pressure chambers, regardless of the position of the piston, and a pilot valve assembly operable within the piston to establish a pressure differential at opposite ends of the piston for moving the same to effect interchange of the connections, said pilot valve assembly comprising a stationary conduit extending axially of the piston and slidably related thereto, the ends of said conduit having respective communication with said pressure chambers, and the central portion of said conduit having communication with the low pressure cylinder port, stationary valve seat means and axially movable valve means within the conduit for selectively opening one and closing the other pressure chamber to the low pressure outlet port, and cut-off valve means in each pressure chamber, said cut-off valve means comprising a ringed valve closure element and an axially opposed valve seat element in each pressure chamber, one of said elements being incorporated in the end of the piston and the other in the closed end of the cylinder, said cut-off valve means being effective to partition their respective pressure chambers so as selectively to limit the transverse area of communication of a pressure chamber with the end of the conduit terminating therein.

7. The combination of claim 6 wherein the ringed valve closure elements are incorporated in the end walls of the cylinder and wherein the ends of the conduit terminate within respective ringed valve closure elements.

References Cited in the file of this patent

UNITED STATES PATENTS

| 393,596 | Westinghouse | Nov. 27, 1888 |
| 518,026 | Drewett | Apr. 10, 1894 |
| 964,866 | Jenner | July 19, 1910 |
| 1,119,640 | Roettger | Dec. 1, 1914 |
| 2,355,434 | Harter | Aug. 8, 1944 |
| 2,526,709 | Tait | Oct. 24, 1950 |
| 2,616,449 | Maha | Nov. 4, 1952 |

FOREIGN PATENTS

| 802,298 | Germany | Feb. 8, 1951 |
| 875,179 | Germany | Apr. 30, 1953 |
| 1,071,554 | France | Mar. 3, 1954 |